United States Patent
Abadi et al.

(10) Patent No.: US 8,495,742 B2
(45) Date of Patent: Jul. 23, 2013

(54) IDENTIFYING MALICIOUS QUERIES

(75) Inventors: Martin Abadi, Palo Alto, CA (US); Yinglian Xie, Cupertino, CA (US); Fang Yu, Sunnyvale, CA (US); John Payyappillil John, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 12/780,935

(22) Filed: May 17, 2010

(65) Prior Publication Data

US 2011/0283360 A1 Nov. 17, 2011

(51) Int. Cl.
G06F 11/00 (2006.01)
G06F 12/14 (2006.01)
G06F 12/16 (2006.01)
G08B 23/00 (2006.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| | | | |
|---|---|---|---|
| 7,379,949 B2 | 5/2008 | Chowdhury | |
| 7,444,331 B1 | 10/2008 | Nachenberg et al. | |
| 7,558,796 B1 * | 7/2009 | Bromwich et al. | 1/1 |
| 7,657,626 B1 | 2/2010 | Zwicky | |
| 2002/0157020 A1 | 10/2002 | Royer | |
| 2006/0107321 A1 * | 5/2006 | Tzadikario | 726/22 |
| 2007/0118669 A1 | 5/2007 | Rand et al. | |
| 2009/0150374 A1 | 6/2009 | Dewey et al. | |
| 2009/0249480 A1 * | 10/2009 | Osipkov et al. | 726/22 |
| 2010/0024033 A1 | 1/2010 | Kang et al. | |

OTHER PUBLICATIONS

"Strengthening Database Security", Retrieved at << http://www.federalnewsradio.com/pdfs/StrengtheningDataBaseSecurityWP.pdf >>, Dec. 2006, pp. 11.

Wassermann, et al., "An Analysis Framework for Security in Web Applications" Retrieved at << http://wwwcsif.cs.ucdavis.edu/~wassermg/research/webapps.pdf >>, Nov. 2004, pp. 9.

Meyer, et al., "Detecting Attacks on Web Applications from Log Files", Retrieved at << http://www.sans.org/reading_room/whitepapers/logging/detecting_attacks_on_web_applications_from_log_files_2074?show=2074.php&cat=logging>>, Jan. 26, 2008, pp. 46.

Provos, et al., "Search worms", Retrieved at << http://doi.acm.org/10.1145/1179542.1179544 >>, Conference on Computer and Communications Security, Proceedings of the 4th ACM workshop on Recurring malcode 2006, Nov. 3-3, 2006, pp. 1-8.

(Continued)

Primary Examiner — Edan Orgad
Assistant Examiner — Harris Wang
(74) Attorney, Agent, or Firm — Microsoft Corporation

(57) ABSTRACT

A framework identifies malicious queries contained in search logs to uncover relationships between the malicious queries and the potential attacks launched by attackers submitting the malicious queries. A small seed set of malicious queries may be used to identify an IP address in the search logs that submitted the malicious queries. The seed set may be expanded by examining all queries in the search logs submitted by the identified IP address. Regular expressions may be generated from the expanded set of queries and used for detecting yet new malicious queries. Upon identifying the malicious queries, the framework may be used to detect attacks on vulnerable websites, spamming attacks, and phishing attacks.

20 Claims, 7 Drawing Sheets

OTHER PUBLICATIONS

Moore, et al., "Evil searching: Compromise and recompromise of internet hosts for phishing", Retrieved at << http://people.seas.harvard.edu/~tmoore/fc09evil.pdf >>, Proceedings of the 13th International Conference on Financial Cryptography and Data Security, 2009, pp. 1-17.

Lampson, Butler., "Computer security in the real world", Retrieved at << http://research.microsoft.com/en-us/um/people/blampson/64-securityinrealworld/acrobat.pdf >>, Computer, vol. 37, No. 6, Jun. 2004, pp. 1-12.

Yu, et al., "Sbotminer: Large scale search bot detection", Retrieved at << http://research.microsoft.com/pubs/115681/wsdm-yu.pdf >>, Web Search and Web Data Mining, Proceedings of the third ACM international conference on Web search and data mining, Feb. 4-6, 2010, pp. 10.

Isard, et al., "Dryad: Distributed data-parallel programs from sequential building blocks", Retrieved at << http://citeseerx.ist.psu.edu/viewdoc/download?doi=10.1.1.70.3539&rep=rep1&type=pdf >>, European Conference on Computer Systems, Proceedings of the 2nd ACM SIGOPS/EuroSys European Conference on Computer Systems, Mar. 21-23, 2007, pp. 14.

Yu, et al., "Dryadlinq: A system for general purpose distributed data-parallel computing using a high-level language", Retrieved at << http://research.microsoft.com/en-us/projects/dryadlinq/dryadlinq.pdf >>, Symposium on Operating System Design and Implementation (OSDI), Dec. 8-10, 2008, pp. 1-14.

Click Forensics, "Industry click fraud rate drops to 12.7% in q2", Retrieved at << http://www.clickforensics.com/newsroom/press-releases/142-click-fraud-index-q2-2009.html >>, Jul. 23, 2009, pp. 1.

Klein, Daniel V., "Defending against the wily surfer-web-based attacks and defenses", Retrieved at << http://www.klein.com/dvk/publications/id99.pdf >>, Proceedings of the Workshop on Intrusion Detection and Network Monitoring citation, Apr. 9-12, 1999, pp. 12.

Zhang, et al., "Detecting click fraud in pay-per-click streams of online advertising networks", Retrieved at << http://ieeexplore.ieee.org/stamp/stamp.jsp?tp=&arnumber=4595871 >>, ICDCS, Proceedings of the 2008, The 28th International Conference on Distributed Computing Systems, Jun. 17-20, 2008, pp. 77-84.

Metwally, et al., "On hit inflation techniques and detection in streams of web advertising networks", Retrieved at << http://ieeexplore.ieee.org/stamp/stamp.jsp?tp=&arnumber=4268205 >>, ICDCS, Proceedings of the 27th International Conference on Distributed Computing Systems, Jun. 25-27, 2007, pp. 8.

Metwally, et al,. "Detectives: detecting coalition hit inflation attacks in advertising networks streams", Retrieved at << http://www2007.org/papers/paper070.pdf >>, International World Wide Web Conference, Proceedings of the 16th international conference on World Wide Web, May 8-12, 2007, pp. 241-250.

Mann, Charles C., "How click fraud could swallow the internet", Retrieved at << http://www.wired.com/wired/archive/14.01/fraud.html >>, Jan. 2006, pp. 3.

Majumdar, et al., "Addressing click fraud in content delivery systems", Retrieved at << http://Ieeexplore.ieee.org/stamp/stamp.jsp?arnumber=04215618 >>, In Proceedings of the 26th IEEE INFOCOM International Conference on Computer Communications, 2007, pp. 240-248.

Daswani, et al., "The anatomy of clickbot.a", Retrieved at << http://www.usenix.org/event/hotbots07/tech/full_papers/daswani/daswani.pdf >>, Proceedings of the first conference on First Workshop on Hot Topics in Understanding Botnets, 2007, pp. 11.

Zeltser, Lenny., "Clickbot", Retrieved at << http://isc.sans.org/diary.html?storyid=1334 >>, May 1, 2006, pp. 1-2.

Buehrer, et al., "A largescale study of automated web search traffic", Retrieved at << http://research.microsoft.com/pubs/69505/buehrerairweb2008.pdf >>, AIRWeb, vol. 295, Proceedings of the 4th international workshop on Adversarial information retrieval on the web, Apr. 22-22, 2008, pp. 8.

Efthimiadis, et al., "An evaluation of how search engines respond to greek language queries", Retrieved at << http://www.computer.org/plugins/dl/pdf/proceedings/hicss/2008/3075/00/30750136.pdf?template=1&loginState=1&userData=anonymous-IP%253A%253A203.8.109.15 >>, Proceedings of the 41st Hawaii International Conference on System Sciences—2008, pp. 1-6.

Moukdad, Haidar., "Lost in cyberspace: how do search engines handle arabic queries", Retrieved at << http://www.cais-acsi.ca/proceedings/2004/moukdad_2004.pdf >>, pp. 1-7.

Eichmann, David., "The rbse spider—balancing effective search against web load", Retrieved at << http://citeseerx.ist.psu.edu/viewdoc/download;jsessionid=403FACE7536E13BDA12F467542889805?doi=10.1.1.55.9376&rep=rep1&type=pdf >>, pp. 1-6.

"Top 20 internet security problems, threats and risks", Retrieved at << http://www.sans.org/top20/2007/ >>, pp. 1-72.

Keizer, Gregg., "Most malware is launched from legit web sites", Retrieved at << http://www.computerworld.com/s/article/311713/Most_MalwareIs_Launched_From_Legit_Web_Sites?source=rss_news50 >>, Jan. 28, 2008, pp. 1-4.

Xie, et al., "Spamming botnets: Signatures and characteristics", Retrieved at << http://ccr.sigcomm.org/drupal/files/p171-xie.pdf >>, ACM SIGCOMM Computer Communication Review, vol. 38, No. 4, Oct. 2008, pp. 171-182.

"Joomla! multiple vulnerabilities", Retrieved at << http://secunia.com/advisories/35278/>>, Jun. 3, 2009, pp. 2.

"PhishTank—Join the fight against phishing", Retrieved at << http://www.phishtank.com >>, Retrieved Date: Mar. 15, 2010, pp. 1-2.

"Composite Blocking List", Retrieved at http://cbl.abuseat.org/ >>, Retrieved Date: Mar. 15, 2010, pp. 1-8.

McDonald, Stuart., "Sql injection: Modes of attack, defence, and why it matters", Retrieved at << http://www.sans.org/reading_room/whitepapers/securecode/sql_injection_modes_of_attack_defence_and_why_it_matters_23? show=23.php&cat=securecode >>, GIAC Security Essentials Certification (GSEC), Practical Assignment—Version 1.4, Apr. 8, 2002, pp. 32.

KC, et al., "Countering code-injection attacks with instruction-set randomization", Retrieved at << http://www.prevelakis.net/Papers/instructionrandomization.pdf >>, Conference on Computer and Communications Security, Proceedings of the 10th ACM conference on Computer and Communications Security, Oct. 27-30, 2003, pp. 10.

Halfond, et al., "Using positive tainting and syntax-aware evaluation to counter sql injection attacks", Retrieved at << http://www.cc.gatech.edu/~whalfond/papers/halfond06fse.pdf >>, Foundations of Software Engineering, Proceedings of the 14th ACM SIGSOFT International Symposium on Foundations of Software Engineering, Nov. 5-11, 2006, pp. 11.

Fu, et al., "Safeli: Sql injection scanner using symbolic execution", Retrieved at << http://people.hofstra.edu/Xiang_Fu/XiangFu/publications/tavweb08.pdf >>, International Symposium on Software Testing and Analysis, Proceedings of the 2008 workshop on Testing, analysis, and verification of web services and applications, Jul. 21-21, 2008, pp. 6.

* cited by examiner

IDENTIFYING MALICIOUS QUERIES

BACKGROUND

Web search has become a powerful and indispensable means for people to obtain information today. However, by crafting specific search queries, hackers may obtain very specific information from search engines that may reveal the existence and locations of security flaws such as misconfigured servers, password files, and vulnerable software. For example, carefully crafted search queries can be used by attackers to gather information such as email addresses or password files or information about misconfigured or even vulnerable servers. As such, the amount of malicious Web search traffic has been increasing. Search bots are submitting malicious searches to identify victims for spreading infections, supporting phishing attacks, determining compromised legitimate domains, spamming, and launching Denial of Service (DoS) attacks. Some of these search bots are stealthy.

Although there are approaches to detect attacks, their correlations to Web search are not well understood. Determining the correlations is a challenging task because search logs contain massive amounts of mixed data from normal users and attackers, and because most of the malicious queries used by attackers are previously unknown and can change frequently.

SUMMARY

A framework identifies malicious queries contained in search logs to uncover relationships between the malicious queries and the potential attacks launched by attackers submitting the malicious queries. A small seed set of malicious queries may be used to identify an IP (Internet protocol) address in the search logs that submitted the malicious queries. The seed set may be expanded by examining all queries in the search logs submitted by the identified IP address. Regular expressions may be generated from the expanded set of queries from all such identified IPs and used for detecting yet new malicious queries. Upon identifying the malicious queries, the framework may be used to detect attacks on vulnerable websites, spamming attacks, and phishing attacks.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
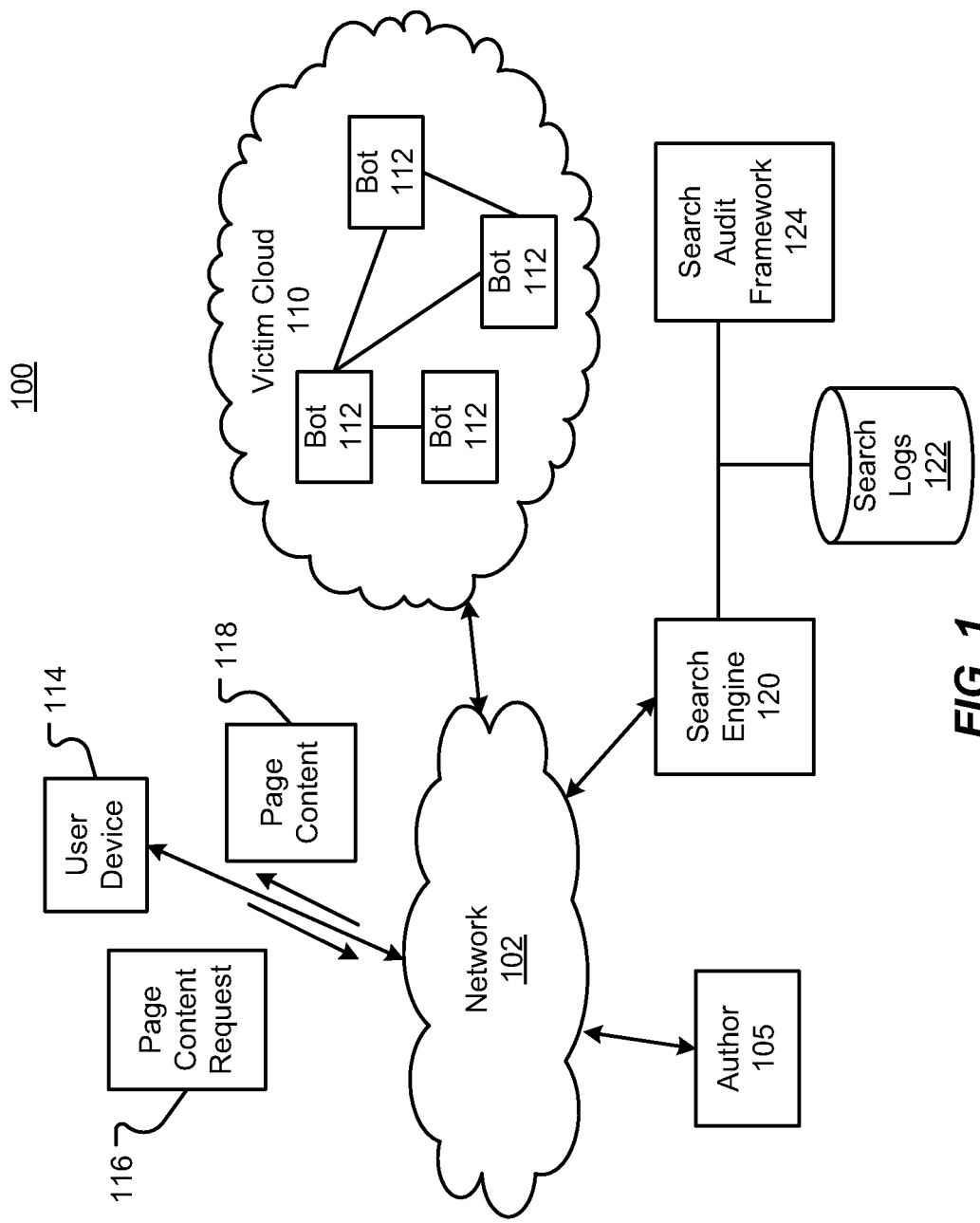
FIG. 1 illustrates an exemplary environment.

FIG. 1 illustrates an exemplary environment 100 including botnets that may be utilized in attacks. FIG. 1 illustrates a computer network 102, a malware author 105, a victim cloud 110 of bot computers 112, a user device 114, a search engine 120, search logs 122, and a search audit framework 124.

The computer network 102, such as a local area network (LAN), wide area network (WAN), the Internet, or a combination thereof, connects the malware author 105 and the victim cloud 110 of bot computers 112 to each other. In addition, the user device 114 and the search engine 120 may connect through the computer network 102. Although not shown, the environment 100 may include many thousands of user devices 114, bot computers 112, and other connected devices.

A bot computer 112 may be programmed directly by attackers, or it may contact other bots, online forums, or other locations/devices to obtain instructions. The instructions obtained by each bot computer 112 direct the actions of the bot computer 112 as it participates in an attack or other activity. The use of bot computers in attacks is one such method attackers may use. Attackers could also use dedicated computers for submitting such queries as well.

The search engine 120 may receive queries for search results. In response, the search engine 120 may retrieve relevant search results from an index of documents (e.g., from an index of web pages). Search results may include, for example, lists of web page titles, snippets of text extracted from those web pages, and hypertext links to those web pages, and may be grouped into a predetermined number (e.g., ten, twenty, etc.) of search results. The search engine 120 may combine the search results with one or more advertisements.

A user device, such as the user device 114, may submit a page content request 116 (a query) to the search engine 120. In some implementations, page content 118 (a results page) may be provided to the user device 114 in response to the request 116. Example user devices 114 include personal computers (PCs), mobile communication devices, television set-top boxes, etc. The user device 114 may comprise a computing device such as the computing device 700 described with respect to FIG. 7, for example.

The bot computers 112 may also submit a page content request 116 to the search engine 120. The submissions of the bot computers 112 to the search engine 120 may be made to influence search results provided by the search engine 120 in the page content 118, deplete an advertising budget of, e.g., clicking through advertising links on the page content 118, determine website vulnerabilities, launch spamming attacks, launch phishing attacks, etc.

The search engine 120 may log information about the page content request 116 from the user device 114 or bot computers 112 in the search logs 122. The search logs 122 may contain the query in the page content request 116, the time at which the query was issued, the set of results returned to the searcher, and properties of the request, such as the user agent and the IP (Internet protocol) address that issued the request, for example.

In accordance with implementations disclosed herein, the search audit framework 124 may identify malicious queries by auditing the search logs 122, and may be used to disrupt or prevent potential attacks. As such, the queries of attackers may be used as a guide to enable a better understanding of their methods and techniques, and to predict and prevent follow-up attacks before they are launched. In response to determining an attack, for example, the search engine 120 may choose not to return results to these malicious queries, making it harder for attackers to obtain useful information. In addition, these malicious queries could provide rich information about the attackers, including their intentions and locations.

Figure 2:
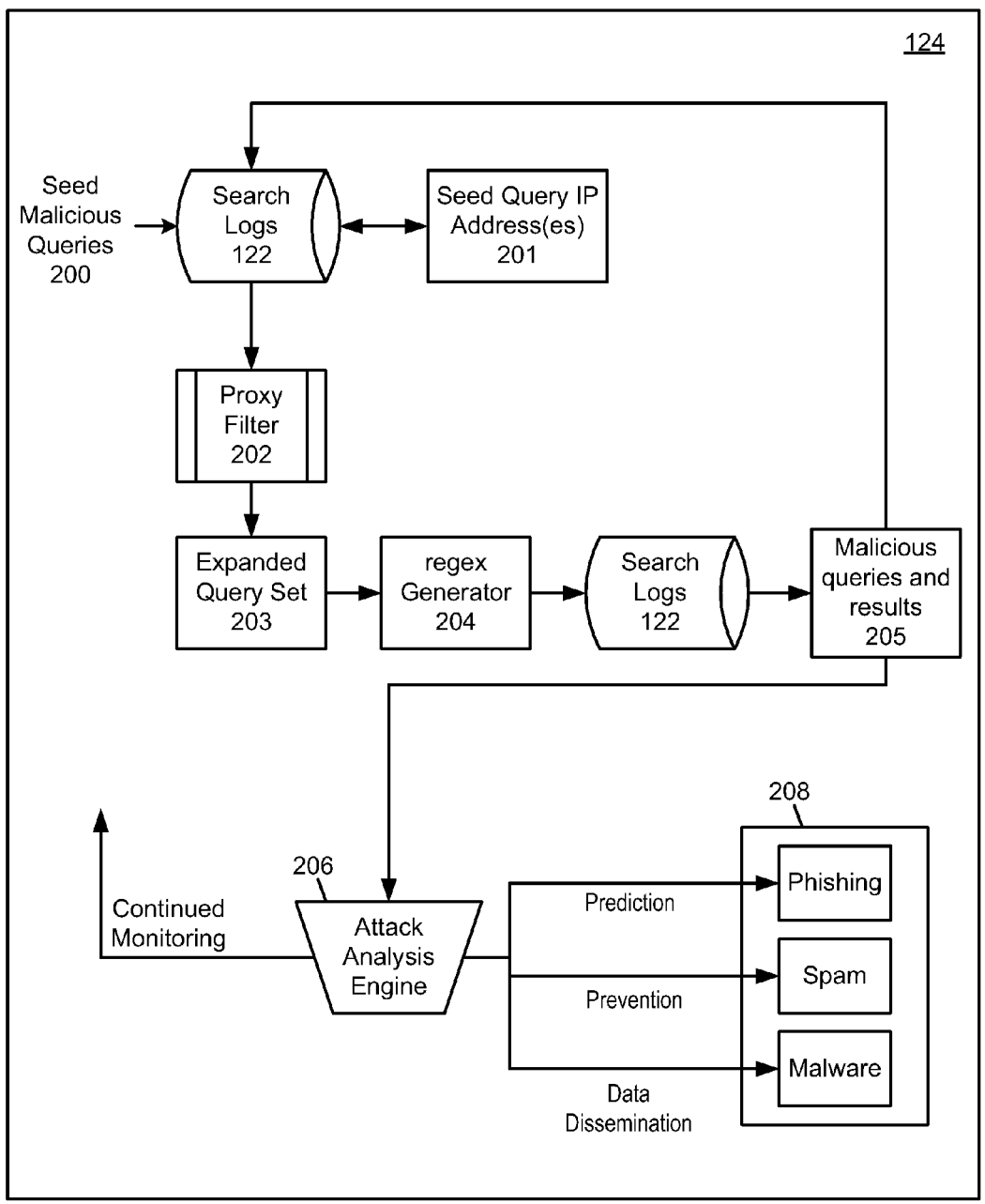
FIG. 2 is a block diagram of the components of an implementation of a search audit framework.

FIG. 2 is a block diagram of the components of an implementation of a search audit framework, such as the search audit framework 124. The search audit framework 124 may be implemented in a computing environment, such as that described with respect to FIG. 7. At a high level, the search audit framework 124 may be viewed as having two stages. In a first stage, the search audit framework 124 may be implemented as a pipeline that audits search logs 122 with seed malicious queries 200 and/or seed query IP address(es) 201, optionally filters proxies using a proxy filter 202, extends the seed malicious queries 200 to create an expanded query set 203, generates regular expressions using a regex (regular expression) generator 204, and generates a set of malicious queries and results 205. The first stage may be used to find different types of malicious queries pertaining to different types of malicious activities. A more detailed discussion of the first stage is provided below with reference to FIG. 4.

The second stage may include an analysis of the malicious queries and results 205 to reveal the correlations and other security attacks. The second stage may include an attack analysis engine 206 to determine types of attacks implicated by the malicious queries and results 205 and to understand the behavior of the different malicious entities submitting the malicious queries. The second stage may indicate the type of attack as an output 208. The output 208 includes information used for prediction, prevention, and data dissemination in accordance with a type of attack. For example, the output 208 may be provided to security applications such that remedial actions may be implemented on identified vulnerable servers. The attack analysis engine 206 may also provide information for continued monitoring by external systems. A more detailed discussion of the second stage is provided below with reference to FIG. 6.

The search audit framework 124 may receive a number of known malicious queries as seed malicious queries 200. The seed malicious queries 200 may be obtained from, for example, known hacker websites, known security vulnerabilities, or previous studies of the search logs 122. The number of available seed malicious queries 200, however, may be limited by known discoveries. As such, the search audit framework 124 may monitor the hosts that conducted these malicious queries to obtain additional queries.

The seed malicious queries 200 are applied to the search logs 122 to expand the number of the malicious queries under examination. For example, the seed malicious queries 200 may be applied to the search logs 122 to find exact query matches. For each record in the search logs 122 where the queries exactly match to one or more of the seed malicious queries 200, the IP address that issued the matching query is extracted. The IP address may be used as the seed query IP address(es) 201, whereby the queries found in the search logs 122 that were issued by the seed query IP address(es) 201 are extracted to create the expanded query set 203. In cases where the IP address of the attacker is already known, the use of the seed malicious queries 200 may not be necessary, as the IP address itself may be used to extract all queries from the search logs 122 to create the expanded query set 203.

The expansion takes advantage of a likelihood that if the IP address issued a matching query to one of the seed malicious queries 200, then it is likely that most of the other queries from this IP address would also be malicious. For example, most attackers typically issue not just a single query, but rather multiple queries. Thus, after the expansion process, the search audit framework 124 may obtain most, if not all, of the queries which were issued from malicious IP addresses.

The proxy filter 202 optionally examines the expanded query set 203 to ascertain if seed query IP address(es) 201 is that of a proxy host. With proxy hosts, there may be malicious searches that are mixed with normal user activities. To address these conditions, the proxy filter 202 may build behavior profiles of users in different geographic regions, and use the behavior profiles to filter out normal user traffic from the malicious traffic. The behavior profiles may be applied as part of a behavioral profiling process performed by the proxy filter 202, to identify the proxies based on their observed behavior.

In particular, a characteristic of a proxy server could be a large query volume, as many proxy IP addresses account for several orders of magnitude more queries than other IP addresses. Rather than eliminating all IP addresses with query volume above a certain threshold, behavioral profiling accounts for a characteristic that that most people in a geographical area are likely to have similar patterns of Web browsing and searching that may be different from that of an attacker.

In addition, queries from different geographic regions may differ. As such the proxy filter 202 may implement a geographical profile instead of a single global user-profile. The search audit framework 124 may apply a granularity to the geographical profile based on an IP prefix. For each /16 IP prefix, a behavioral profile may be created, which includes, e.g., a set of the 100 most popular queries from all the IPs in that prefix. Other granularities may be used, such as a country code. The search audit framework 124 may determine that the set of queries issued from a proxy has a large overlap with the profile of that prefix, whereas queries issued by an aggressive attacker have little or no overlap. In some implementations, a threshold of 5 (or other) may be set, such that an IP is considered an attacker's IP only if less than 5 queries issued from that IP are present in the profile of that IP's prefix. With this, the framework may eliminate proxies from the query set with a large number of legitimate queries.

In some implementations, the search audit framework 124 may use regular expressions to match potentially unknown malicious queries in the search logs 122. Regular expressions are more general than exact query matches and may match malicious searches even if attackers slightly change the search terms. For example, hackers may add restrictions to the query terms, e.g., adding "site:cn" which will obtain search results in the .cn domain only. Also, as many of the queries are generated using scripts, regular expressions can capture the structure of the queries and therefore are able to match future malicious queries.

Regular expression generation may be performed by the regex generator 204. In some implementations, regular expressions may be derived using a similar process as disclosed in U.S. patent application Ser. No. 12/104,441, entitled "AUTOMATIC BOTNET SPAM SIGNATURE GENERATION" (incorporated herein by reference in its entirety) for example, and incorporating additional information from the search domain, such as an importance to word boundaries, and additional weight to special characters and sequences in a query, etc. The regex generator 204 may build a suffix array to identify the popular keywords in the input set. Next, the regex generator 204 picks a most popular keyword and builds a root node that contains all the input strings matching this keyword. For the remaining strings, the regex generator 204 repeats the process of selecting root nodes until all strings are selected. Then, the regex generator 204 recursively processes each tree to form a forest. For each tree node, the keywords on the path to the root construct a pattern. The regex generator 204 then checks the content between keywords and may place restrictions on it (e.g., [0-9]{1,3}) to constrain the intervening content to be one to three digits).

In addition, for each regular expression, a score may be determined by the regex generator 204 that measures the likelihood that the regular expression would match a random string. This score is based on entropy analysis, for example, as described in U.S. patent application Ser. No. 12/104,441, entitled "AUTOMATIC BOTNET SPAM SIGNATURE GENERATION"; the lower the score, the more specific the regular expression. However, a regular expression that is too specific (i.e., the score is too high) may be equivalent to having an exact match, and thus may lose the benefit of using the regular expression. As such, a threshold score may be determined to pick the set of regular expressions to balance the tradeoff between the specificity of the regular expression and the possibility of it matching too many benign queries. For example, regular expressions may be selected with a score lower than 0.6.

Figure 3:
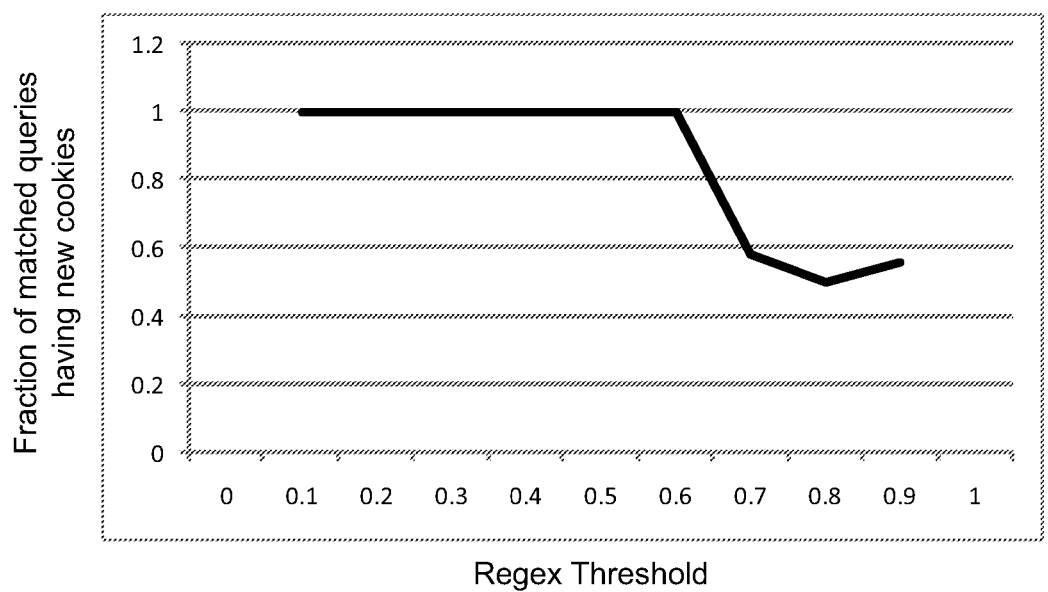
FIG. 3 illustrates a relationship between a threshold and a fraction of matched queries having new cookies.

In some implementations, a number of new cookies may be used as a metric by the regex generator 204 for selecting the threshold. For random search queries, the number of new cookies is about 40%, for example. However, for the known malicious queries (i.e., the seed malicious queries 200), the number of new cookies may be much higher (e.g., close to 100%), because most automated traffic does not enable cookies, or presents invalid cookies. Thus, in determining the threshold, the percentage of new cookies in the matched queries should be high as well. FIG. 3 illustrates an example of a relationship between the threshold and the fraction of matched queries having new cookies. As shown in FIG. 3, regular expressions with scores lower than 0.6 have very high new cookie rates (greater than about 99.85%). Additionally or alternatively to new cookies, characteristics of the searchers may be used to select the threshold, such as whether toolbars were used to submit the queries.

The regular expressions generated by the regex generator 204 may be used to match the search logs 122 to identify more malicious queries. As noted above, the regular expressions aid in capturing the structure of the malicious queries, which helps identify future and unknown queries. Applying the regular expressions to the search logs 122 extracts the queries matching the regular expressions. This creates an enlarged set of malicious queries and results 205. The malicious queries and results 205 may include the malicious queries, IP address(es) of attackers, and/or the regular expressions generated by the regex generator 204.

In accordance with implementations herein, the malicious queries and results 205 may be fed back into the search audit framework 124 as the seed malicious queries 200 for another iteration through the search audit framework 124.

The second stage of the search audit framework 124 includes the attack analysis engine 206, which may use Web search to study the correlations between attacks, as identified by the regular expressions and the corresponding query results. Many different types of attacks may be identified, such as attacks on vulnerable websites, forum spamming, and phishing. The identified attack may be provided as the output 208 of the second stage or for continued monitoring by external systems.

For example, when searching for vulnerable websites and servers, attackers may search within the structure of URLs to find ones that take particular arguments. For example, "[^?=#+@;&:]{0,1}index\.php\?content=[^?=#+@;&:]{1,10}"

searches for websites that are generated by PHP scripts and take arguments (content=). Attackers may try to exploit these websites by using specially crafted arguments to check whether they have popular vulnerabilities, such as SQL injection.

Another approach by attackers to attack vulnerable websites is to perform malicious searches which are more targeted, focusing on particular software with known vulnerabilities. For example, malicious queries that start with "Powered by" followed by the name of a particular piece of software and version number are searches for known vulnerabilities in some version of that software.

Another category of malicious searches are those aimed towards performing certain actions on websites that are generated by a particular piece of software. A common goal is forum spamming, which includes spamming on blogs and forums. For example, a regular expression, "/includes/joomla\.php" site:\.[a-zA-Z]{2,3} searches for blogs generated by JOOMLA® website software. Attackers may then have scripts to post spam to such blogs/forums.

Forum spamming is a way to deliver spam messages to a large audience. In addition, it is also often used as a technique to boost the page rank of websites. To do so, spammers insert the URL of the target website that they want to promote in the spam message. By posting the message in many online forums, the target website would obtain a high in-degree of links, resulting in a higher page rank.

Knowledge of forum searching IP addresses and query search terms can be used to help filter forum spam. After the malicious search, the search result pages can be followed to clean up the spam posts. More aggressively, even before the malicious search, by recognizing the malicious query terms or the malicious IP addresses, search engines can refuse to return search results to the spammers. Web servers could also refuse connections from IPs which are known to search for forums.

The attack analysis engine 206 may be used for identifying vulnerable websites that may be used to host phishing pages and malware. A typical phishing attack starts with an attacker searching for vulnerable servers, by crawling the Web, probing random IP addresses, or searching the Web with the help of search engines. After obtaining a vulnerable server and compromising it, the attacker can host malware and phishing pages on this compromised server. Next, the attacker advertises the URL of the phishing or malware page through spam or other means. If users are tricked by the spam emails into visiting the compromised server, the attacker can conduct cyber crimes such as stealing user credentials and infecting computers.

The attack analysis engine 206 may detect phishing/malware attacks at an early stage, when the attacker is searching for vulnerabilities, or perhaps even proactively prevent servers from being compromised. A notification process may be set up to warn the owners to patch their servers. Meanwhile, if spam messages advertising links from these servers are present, they could be filtered, preventing users from being phished or compromised.

Messenger phishing attacks may operate as follows:

1. The unsuspecting victim (Alice) receives a message from one of her contacts asking her to check out some party pictures with a link to one of the phishing sites.

2. The victim clicks the link and is taken to the web page which looks very similar to the legitimate messenger login screen, and asks her to enter her messenger credentials. As such, the victim enters her credentials.

3. The victim is now taken to a page http://<domain-name>.com?user=alice.jane, which redirects to image search results from a search engine for party.

4. The attackers now have the victim's credentials. They log into Alice's account and send a similar message to her friends to further propagate the attack.

Attackers may use a search engine in this type of attack because using images from a search engine is less likely to tip off the victim than if the images were hosted on a random server. Also, the attackers do not need to host any web pages themselves, and can offload the costs of hosting to the search engine servers.

This type of attack generates search traffic that contains keywords (e.g., "party"). Because the queries of this attack are identical or similar, the attack analysis engine 206 may focus on the query referral field, where the source of traffic redirection is recorded. As such, regular expressions from the query referral field may be generated as follows:

1. http://[a-zA-Z0-9.]*.<domain-name>.com/

2. http://<domain-name>.com?user=[a-zA-Z0-9.]*

In the second regular expression, the pattern [a-zA-Z0-9.]* appears to be a random set of letters and numbers. However, based on the entire regular expression context, this pattern describes usernames. In the example attack scenario above, when Alice is redirected to the image search results, the HTTP referrer is set to http://<domain-name>.com?user=alice.jane. Using this information, the attack analysis engine 206 can identify the set of users whose credentials may have been compromised.

Figure 4:
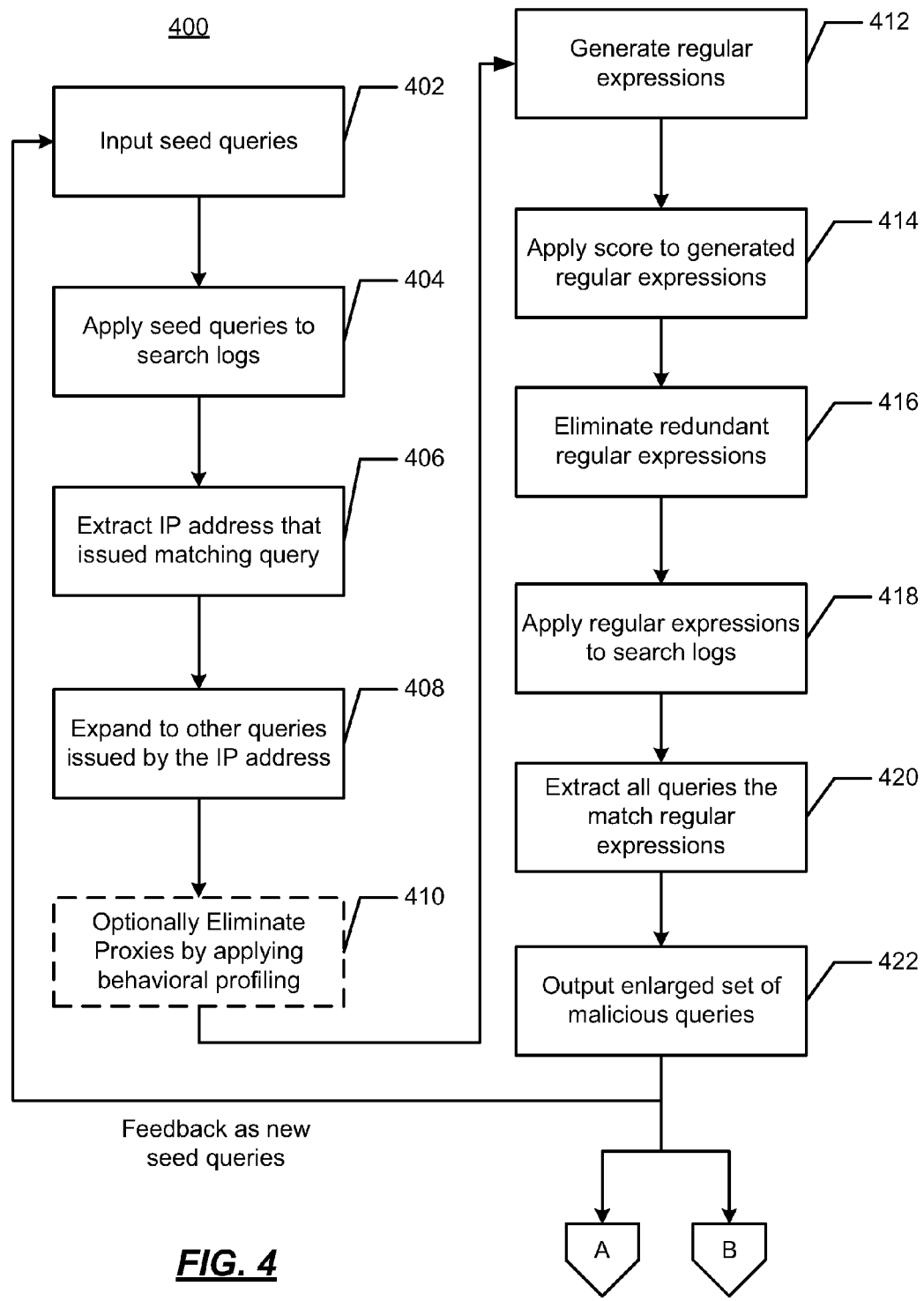
FIG. 4 is an example operational flow diagram of processes performed by the search audit framework to identify malicious queries.

FIG. 4 is an example operational flow diagram 400 of processes performed by the search audit framework 124 to identify malicious queries. At 402, the search audit framework 124 receives a number of known malicious queries as seed input. The seed malicious queries 200 used as seed input may be obtained from, for example, hackers' websites, known security vulnerabilities, or previous studies of search logs 122.

At 404, the seed malicious queries are applied to the search logs 122 to expand the seed malicious queries. For example, the seed malicious queries 200 may be applied to the search logs 122 to find exact query matches. At 406, for each record in the search logs 122 where the queries match exactly, the IP address that issued the query is extracted.

At 408, the (e.g., all) queries which were issued by IP address identified at 404 are extracted. The queries in the search logs 122 submitted by the IP address may be extracted to create an expanded set of malicious queries. In some implementations, at 408, the process accounts for dynamic IP addresses that may be assigned by Dynamic Host Configuration Protocol (DHCP) servers. For example, to reduce the impact of dynamic IPs, queries from the IP address may be considered only over a predetermined period of time with respect to a seed query, e.g., one day.

At 410, the proxies are optionally eliminated by applying behavioral profiling. In some implementations, this operation may be optionally performed to speed up processing to identify malicious queries. The proxies may be identified based on their observed behavior. For attackers, especially if they use botnets to conduct malicious queries, their queries would be very different from the normal users in most locations. Alternative methods may be used to speed up processing, including examining a ratio of new cookies that a generated regular expression matches. In some implementations, if there are other sources of proxy information, the framework 124 may use a list of proxies and eliminate them as well.

At 412, regular expression generation is performed. Regular expressions may be generated to capture variations of queries submitted by attackers that may be present in the search logs 122. At 414, a score may be determined that measures the likelihood that the regular expression would match a random string. As noted above, the score may be based on entropy analysis in an implementation, although other scoring techniques may be used.

At 416, redundant regular expressions may be eliminated. It is possible that the regular expressions generated at 412, although not identical, may match the same/similar set of queries. For example, three input strings query site:A, query site:B, and query may generate two regular expressions query.{0,7} and query site:.{1}. The two regular expressions have different coverage and scores, but are both valid. In order to eliminate redundancy in regular expressions, a consolidation routine may be implemented as shown below:

$V \leftarrow \cup_{i\,=\,1}$"MATCHES$(S,R_i)$
while $|V| > 0$ do
   $R_{max} \leftarrow R_j$ where $R_j$ is the regex which matches the most strings in V
   $R \leftarrow R \cup R_j$
   $V \leftarrow V - $ MATCHES$(V,R_j)$
end while
return R.

The consolidation routine may be a greedy algorithm and does not return the minimal set of regular expressions used to match all the input strings. In addition, if the input to the regular expression generator is too large, it is split into multiple fragments and regular expressions are generated for each fragment separately. These regular expressions can then be merged together using the above consolidation routine.

At 418, the regular expressions may be applied to the search logs 122. This may identify more, potentially unknown malicious queries. As noted above, the regular expressions aid in capturing the structure of the malicious queries, which helps identify future queries. At 420, the queries matching the regular expressions are extracted. This creates an enlarged set of malicious queries that are output at 422.

In accordance with implementations herein, the enlarged set of malicious queries output at 422 may be fed back into the search audit framework 124 as new seed malicious queries 200 for another iteration through the search audit framework 124, or may be verified to determine if the they are indeed malicious. The enlarged set of malicious queries output at 422 may also be used for further analysis in the second stage.

Figure 5:
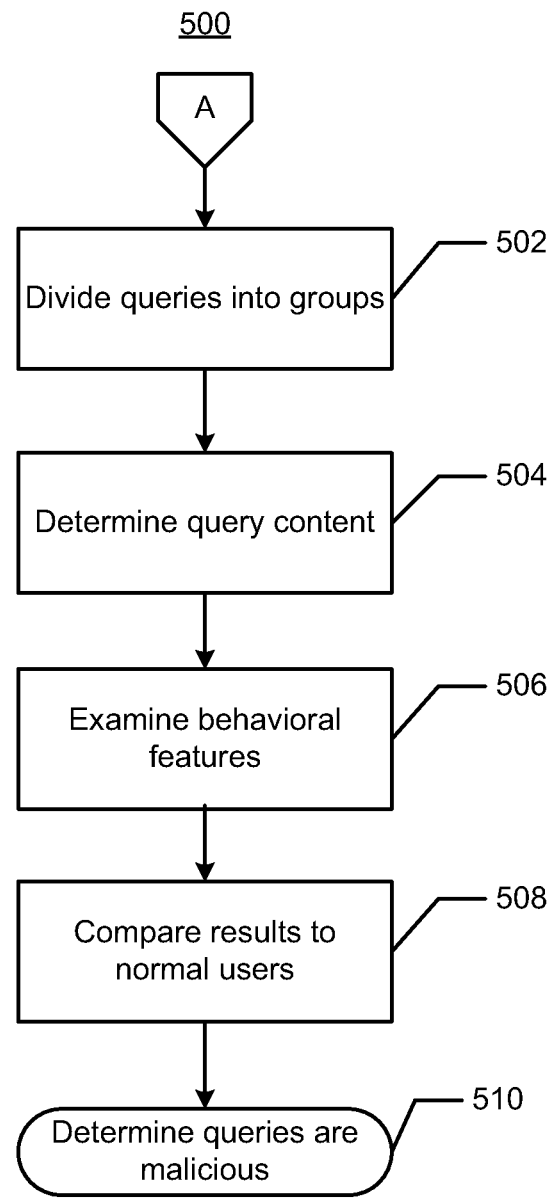
FIG. 5 illustrates an example operational flow diagram of processes to verify the malicious queries.

FIG. 5 illustrates an example operational flow diagram of processes to verify the malicious queries. At 502, the queries output at 422 by the search audit framework 124 may be divided into groups based on which regular expression they match. For each group, a fraction of queries that agree on different features in the log may be examined. Sets of behavioral features may be examined that indicate whether the query is automated, and if a set of queries were generated by the same script.

At 504, query content is determined. A first set of features may be examined with respect to individual bot-generated queries and indicates whether a query itself is likely to be scripted or not. The first set of features may include:

Cookie: This is the cookie presented in the search request. Most bot queries do not enable cookies, resulting in an empty cookie field. For normal users who do not clear their cookies, all the queries carry the same Client ID (which is stored in the cookie). Bot queries which do not have cookies enabled will generate a new client ID with each request.

Link clicked: Whether any link in the search results was clicked by the user, and if so, which one.

JavaScript enabled: Whether the user had JavaScript enabled in their browser.

At 506, behavioral features are determined. A second set of features may be examined that relates to botnet group properties. In particular, they quantify the likelihood that the different queries captured by a particular regular expression were generated by the same (or similar) script. The second set of features may include:

FORM ID: This is set by the search engine based on where the query was issued from, e.g., the search home page, search box in the browser, etc.

User Agent: This is a string provided by the browser to identify itself when it sends a request to the search engine.

At 508, the features are compared to normal user features. For malicious queries, a significant fraction of the queries agree on the FORM ID feature, whereas for regular users, there is typically a wide distribution of FORM IDs. For malicious queries, a very high percentage of returned queries in a group have no links clicked, since the goal of the attackers is perhaps to just scrape the search results. On the other hand, for normal users, over 85% of the searches result in clicks, in an example. Also, most of the detected malicious queries have JavaScript disabled in an example, suggesting that they might be automated queries not issued by a real browser. In contrast, a significantly high percentage of regular queries issued by normal users have JavaScript enabled, in the example. These common features suggest that queries captured by the search audit framework 124 may be automated or scripted searches, rather than being submitted by regular users. A similar trend is in the user-agent string. For normal users, the user-agent strings rarely match, while for malicious queries, more than half of them share the same user-agent string.

At 510, from the analysis at 508, if the features are indicative of malicious queries, then it is determined that the queries output at 422 are indeed malicious.

In some implementations, in the verification process, the statistics of the above features may be compared to those using just an exact match of seed queries to check whether the use of regular expressions might increase the number of benign queries in the results. Although the use of regular expressions significantly increases the number of queries returned, regular expressions do not change the average group statistics on any of these features, except the user-agent string.

Figure 6:
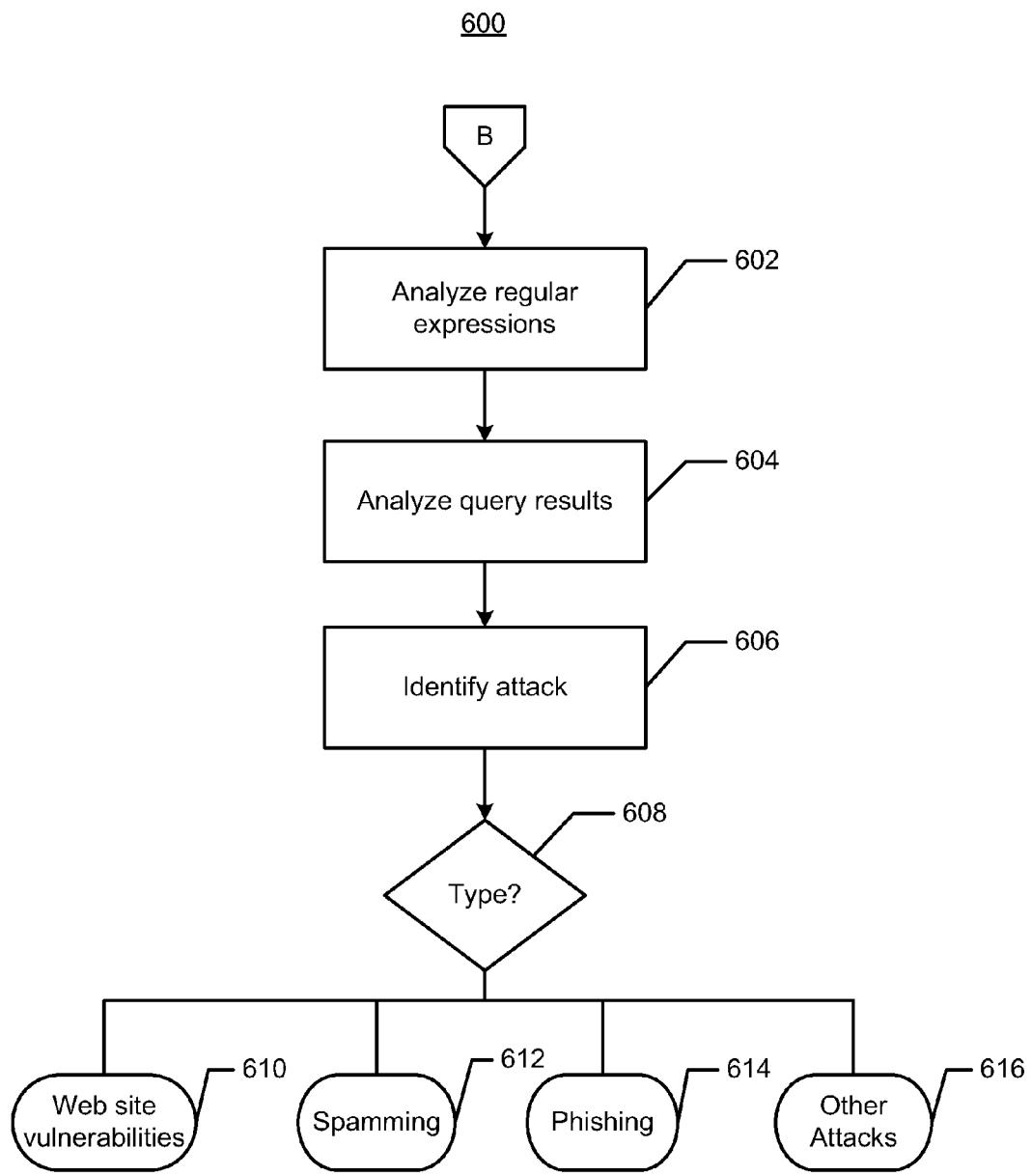
FIG. 6 illustrates an example operational flow diagram of processes performed by the search audit framework to analyze malicious queries.

FIG. 6 illustrates an example operation flow diagram of processes performed by the search audit framework 124 to analyze malicious queries. At 602, the regular expressions output at 422 may be analyzed. For example, different types of attacks may result in different regular expressions that are particular to the attack, as described above. At 604, the enlarged set of malicious queries output at 422 may be analyzed. For example, certain structures, keywords, and software packages may be within the query results, further providing an indication of the type of attack.

At 606, determinations made at 602 and 604 may be used to identify the particular attack. As described above, based on the type of attack, the regular expressions and enlarged set of malicious queries may be classified based on their patterns, which are indicative of the type of attack. For example, at 608, it may be determined that queries are indicative of, for example, an attack on website vulnerabilities (610), spamming (612), phishing (614), or other attacks (616). The other attacks 616 may be more specifically identified in accordance with the implementations described above.

Thus, the search audit framework 124 may identify malicious queries and prevent potential attacks. An analysis of the queries output by the search audit framework 124 may provide information to a search engine, such that the search engine may intelligently choose not to return results to these malicious queries, making it harder for attackers to obtain useful information.

Figure 7:
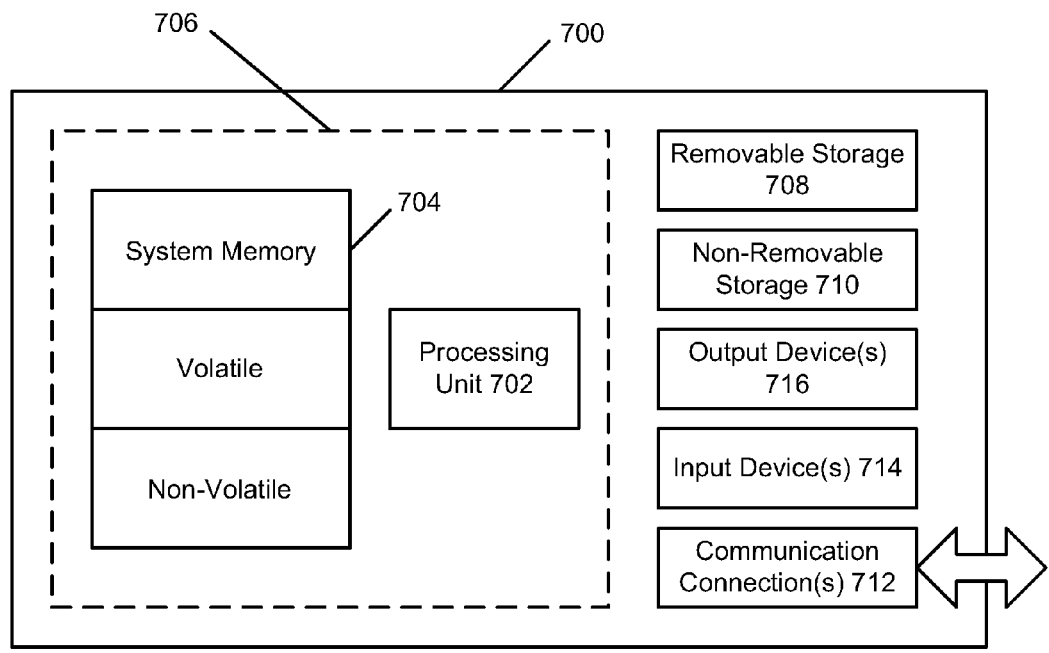
FIG. 7 shows an exemplary computing environment.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of identifying malicious queries, comprising:
    applying a set of seed malicious queries to search logs to extract an Internet protocol (IP) address associated with a query in the search logs that matches one of the set of seed malicious queries;
    creating an expanded malicious query set by applying the IP address to the search logs to identify other queries submitted from the IP address;
    capturing variations of queries in the expanded malicious query set that are contained in the search logs;
    extracting an enlarged set of malicious queries from the search logs; and
    outputting the enlarged set of malicious queries and the IP address.

2. The method of claim 1, further comprising:
    generating regular expressions at a regular expression generator;
    extracting malicious queries from the search logs that match the regular expressions to determine the enlarged set of malicious queries; and
    outputting the regular expressions.

3. The method of claim 2, further comprising eliminating redundant regular expressions that match similar queries in the search logs.

4. The method of claim 2, further comprising performing an attack analysis using the regular expressions and the enlarged set of malicious queries to determine a type of attack associated with the enlarged set of malicious queries.

5. The method of claim 4, further comprising analyzing the regular expressions to determine the type of attack as one of an exploitation of a website vulnerability, a spamming attack, or a phishing attack.

6. The method of claim 1, further comprising profiling a behavior associated with the IP address to determine if the IP address is associated with a proxy.

7. The method of claim 6, further comprising:
    defining a granularity to be applied to a geographic profile associated with the behavior;
    defining popular queries within the granularity; and
    determining a difference between the IP address and the geographic profile.

8. The method of claim 1, further comprising identifying previously unknown malicious queries within the enlarged set of malicious queries.

9. The method of claim 1, further comprising iteratively processing by feeding-back the enlarged set of malicious queries as the set of seed malicious queries.

10. The method of claim 1, further comprising verifying by examining features of the enlarged set of malicious queries to determine if the enlarged set of malicious queries were generated by a script or generated having botnet group properties.

11. The method of claim 1, further comprising providing information regarding the malicious queries to security applications for remedial actions to be taken by vulnerable servers.

12. A system for identifying malicious queries, comprising:
    a storage server that stores a plurality of search logs, the search logs including records each containing a query, a time at which the query was issued, a set of results returned, a user agent, and an IP (Internet protocol) address that issued the query;
    a proxy filter that profiles behaviors associated with the IP address to determine if the IP address is associated with a proxy; and
    a regular expression generator that generates regular expressions that are applied to the search logs,
    wherein a set of seed malicious queries are input to the storage server to extract the IP address from the search logs that submitted a query that matches one of the set of seed malicious queries to create an expanded query set that is used by the regular expression generator to generate the regular expressions, and
    wherein the regular expressions are applied to the search logs to output an enlarged set of malicious queries.

13. The system of claim 12, wherein the expanded query set is generated by applying the IP address to the search logs to identify other queries submitted from the IP address.

14. The system of claim 12, wherein the regular expression generator determines a score that measures the likelihood that a particular regular expression matches a random string, and wherein the regular expression generator discards the regular expressions that exceed the score.

15. The system of claim 12, further comprising a feedback loop where the enlarged set of malicious queries is iteratively provided as the set of seed malicious queries.

16. The system of claim 12, further comprising an attack analysis engine that uses the regular expressions and the enlarged set of malicious queries to determine a type of attack associated with the enlarged set of malicious queries, wherein the type of attack is an exploitation of a website vulnerability, a spamming attack, or a phishing attack.

17. A method for identifying attack-related queries made to a search engine, comprising:
- extracting a set of queries associated with suspect IP (Internet protocol) address from a plurality of search logs stored in a storage server;
- generating a plurality of regular expressions at a regular expression generator that capture variations of the set of queries, the regular expressions being assigned a score that measures the likelihood that a particular regular expression matches a random string;
- discarding the regular expressions that exceed the score;
- applying the regular expressions to the search logs to extract the attack-related queries from the search logs; and
- outputting the attack-related queries, the regular expressions, and the IP address.

18. The method of claim 17, further comprising feeding back the attack-related queries to extract a subsequent suspect IP address or a subsequent set of attack-related queries from the search logs.

19. The method of claim 17, further comprising profiling a behavior associated with the IP address to determine if the IP address is associated with a proxy.

20. The method of claim 17, further comprising performing an attack analysis using the regular expressions and the attack-related queries to determine a type of attack.

* * * * *